United States Patent
D O et al.

(10) Patent No.: US 11,829,285 B2
(45) Date of Patent: Nov. 28, 2023

(54) MULTIPLE APPLICATION SMOKE TEST

(71) Applicant: SAP SE, Walldorf (DE)

(72) Inventors: Manoj Karthick D O, Bangalore (IN); Ashish Kumar, Bangalore (IN); Relvin Richards Raj, Bangalore (IN)

(73) Assignee: SAP SE, Walldorf (DE)

( * ) Notice: Subject to any disclaimer, the term of this patent is extended or adjusted under 35 U.S.C. 154(b) by 149 days.

(21) Appl. No.: 17/511,404

(22) Filed: Oct. 26, 2021

(65) Prior Publication Data

US 2023/0129951 A1 Apr. 27, 2023

(51) Int. Cl.
*G06F 11/36* (2006.01)
*G06F 11/30* (2006.01)
*G06F 11/32* (2006.01)

(52) U.S. Cl.
CPC ...... *G06F 11/3688* (2013.01); *G06F 11/3072* (2013.01); *G06F 11/328* (2013.01); *G06F 11/3684* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 2007/0288903 A1* | 12/2007 | Manglik | G06F 8/60 717/124 |
| 2019/0034320 A1* | 1/2019 | Stokes | G06F 11/3692 |
| 2020/0104110 A1* | 4/2020 | Singh | G06F 11/1433 |

* cited by examiner

*Primary Examiner* — Isaac Tuku Tecklu
(74) *Attorney, Agent, or Firm* — Fountainhead Law Group P.C.

(57) ABSTRACT

A collection of multiple software applications may be tested when a patch is issued. However, an emergency patch for a time-sensitive incident may not allow for full regression or functional testing. Provided herein are techniques for performing a multiple application smoke test. Access information, login information, and a success indicator are obtained for each of a plurality of software applications. A test plan including two or more test packages is determined. Each test package indicates a subset of applications and includes access information, login information, and success indicators corresponding to the subset. The test packages are executed in parallel, including authenticating, loading, and validating. Logs are generated and a user interface is provided to present the logs and whether validation of the application interfaces passed or failed, and a failure reason for failed tests.

20 Claims, 8 Drawing Sheets

MULTIPLE APPLICATION SMOKE TEST

BACKGROUND

The present disclosure pertains to application testing and in particular to smoke testing of multiple applications.

Modern software may be provided as a collection of multiple software applications. These applications may be updated, modified, or patched over time. A software patch generally refers to a set of changes to a software application or related data to update, fix, or improve it. In some situations, a "emergency patch" may be issued in response to a time-sensitive incident, such as a security vulnerability or software fault. In the case of an emergency patch, the time-sensitivity of the incident may not allow for full regression testing (e.g., validating newly added functionality and existing functionality after a patch) or functional testing (e.g., validating functional requirements of the software).

This may become problematic if an emergency software patch to an application is deployed without testing and that patch causes an error that prevents that application or another application from loading or opening.

Accordingly, there is a need for improved techniques for quickly testing multiple application. The present disclosure addresses these issues and others, as further described below.

SUMMARY

Some embodiments provide a computer system comprising one or more processors and one or more machine-readable medium coupled to the one or more processors. The one or more machine-readable medium storing computer program code comprising sets of instructions executable by the one or more processors. The sets of instructions being executable to obtain access information, login information, and a success indicator for each of a plurality of software applications. The sets of instructions being further executable to determine a test plan including two or more test packages. Each test package of the two of more test packages indicates a subset of applications of the plurality of software applications and includes access information corresponding to the subset of applications, login information corresponding to the subset of applications, and success indicators corresponding to the subset of applications. The sets of instructions being further executable to execute the two or more test packages in parallel. The execution of each test package of the two or more test packages including authenticating with the subset of applications using the corresponding login information, loading each of the subset of applications using the corresponding access information to obtain application interfaces, validating whether the application interfaces include the corresponding success indicator, and generating logs indicating whether the validation of the application interfaces passed or failed based on inclusion of the corresponding success indicator. The sets of instructions being further executable to provide a test log user interface presenting a portion of the logs indicating whether the validation of the application interfaces passed or failed, where logs for failed validations include a failure reason.

Some embodiments provide one or more non-transitory computer-readable medium storing computer program code. The computer program code comprises sets of instructions to obtain access information, login information, and a success indicator for each of a plurality of software applications. The computer program code further comprising sets of instructions to determine a test plan including two or more test packages. Each test package of the two of more test packages indicating a subset of applications of the plurality of software applications and including access information corresponding to the subset of applications, login information corresponding to the subset of applications, and success indicators corresponding to the subset of applications. The computer program code further comprising sets of instructions to execute the two or more test packages in parallel. The execution of each test package of the two or more test packages including authenticating with the subset of applications using the corresponding login information, loading each of the subset of applications using the corresponding access information to obtain application interfaces, validating whether the application interfaces include the corresponding success indicator, and generating logs indicating whether the validation of the application interfaces passed or failed based on inclusion of the corresponding success indicator. The computer program code further comprising sets of instructions to provide a test log user interface presenting a portion of the logs indicating whether the validation of the application interfaces passed or failed, where logs for failed validations include a failure reason.

Some embodiments provide a computer-implemented method. The method comprises obtaining access information, login information, and a success indicator for each of a plurality of software applications. The method further comprises determining a test plan including two or more test packages. Each test package of the two of more test packages indicating a subset of applications of the plurality of software applications and including access information corresponding to the subset of applications, login information corresponding to the subset of applications, and success indicators corresponding to the subset of applications. The method further comprises executing the two or more test packages in parallel. The execution of each test package of the two or more test packages including authenticating with the subset of applications using the corresponding login information, loading each of the subset of applications using the corresponding access information to obtain application interfaces, validating whether the application interfaces include the corresponding success indicator, and generating logs indicating whether the validation of the application interfaces passed or failed based on inclusion of the corresponding success indicator. The method further comprises providing a test log user interface presenting a portion of the logs indicating whether the validation of the application interfaces passed or failed, where logs for failed validations include a failure reason.

The following detailed description and accompanying drawings provide a better understanding of the nature and advantages of the present disclosure.

DETAILED DESCRIPTION

Figure 1:
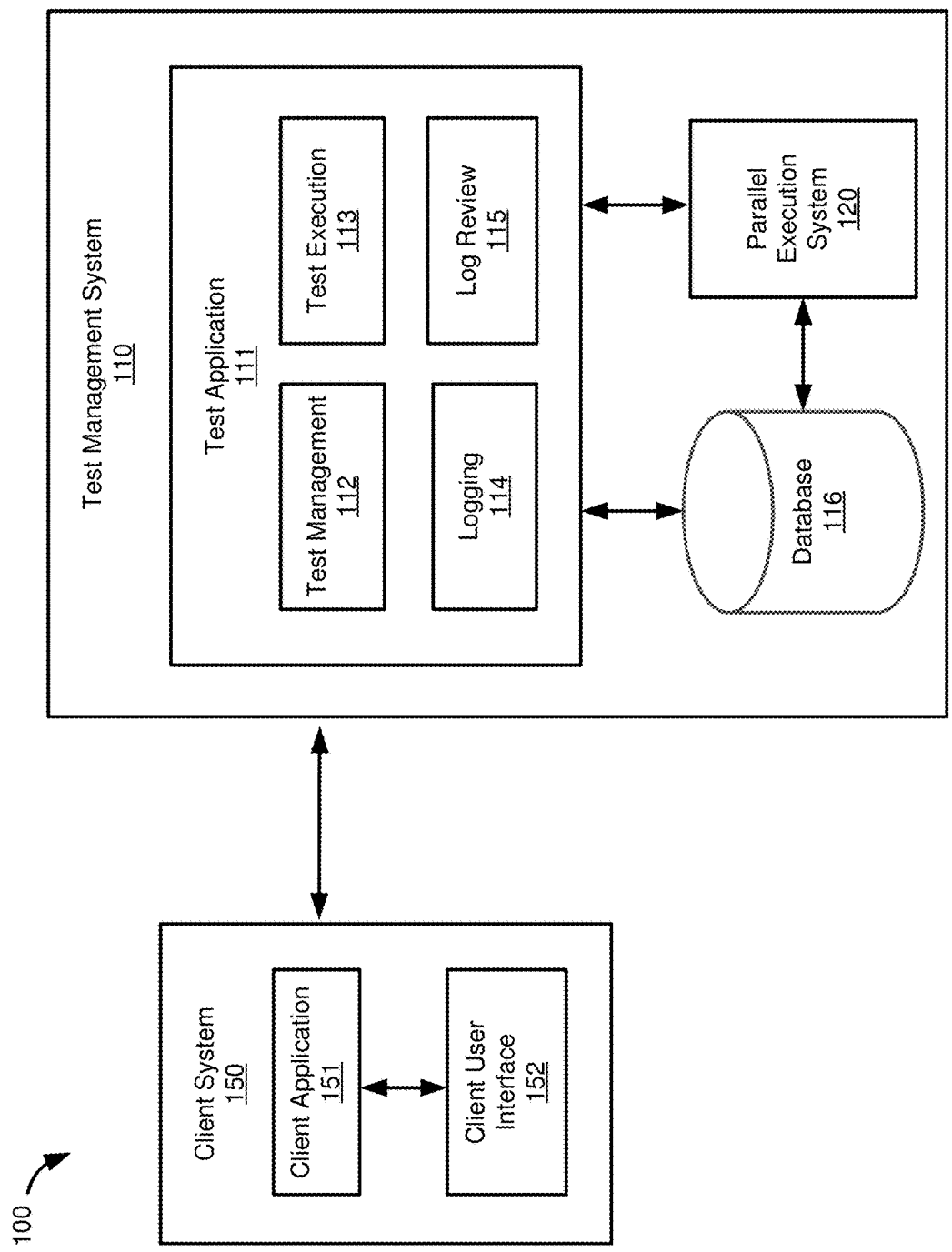
FIG. 1 shows a diagram of a test management system, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein. While certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order.

As mentioned above, modern software may be provided as a collection of multiple software applications. These applications may be updated, modified, or patched over time. A software patch generally refers to a set of changes to a software application or related data to update, fix, or improve it. In some situations, a "emergency patch" may be issued in response to a time-sensitive incident, such as a security vulnerability or software fault. In the case of an emergency patch, the time-sensitivity of the incident may not allow for full regression testing (e.g., validating newly added functionality and existing functionality after a patch) or functional testing (e.g., validating functional requirements of the software).

This may become problematic if an emergency software patch to an application is deployed without testing and that patch causes an error that prevents that application or another application from loading or opening.

Accordingly, there is a need for improved techniques for quickly testing multiple application. The present disclosure addresses these issues and others, as further described below.

FIG. 1 shows a diagram of a test management system 110, according to an embodiment. The test management system 110 may comprise one or more server computers and include one or more databases including database 116. The test management system 110 provides a test application 111 for managing and testing a plurality of software applications (not shown). The testing of the plurality of software applications may be performed on a parallel execution system 120 that is part of the test management system. In some embodiments the parallel execution system 120 may be external to the test management system and may be accessible over a network connection. The test application 111 may be provided using a cloud-based platform or an on-premise platform, for example. The application 111 may be accessible using a web browser or mobile application, for example. Access information, login information, and success indicators used in performing the testing may be stored in the database 116. The database 116 may also store logs and results of the testing.

The test application 111 includes test management functionality 112, test execution functionality 113, logging functionality 114, and log review functionality 115. The test management functionality 112 provides for configuration of a test plan including two or more test packages, where each test package is used to test a subset of a plurality of software applications. Test management 112 provides for input of access information, login information, and a success indicator for each of a plurality of software applications. The access information for a particular software application may include a Uniform Resource Locator (URL) for a webpage providing access to the particular software application. Each application may have a corresponding URL used to access that application. For example, the applications may be provided by a cloud-based platform accessible using a web browser. The login information may include corresponding authentication credentials. The authentication credentials may be a username and a password, for example. The success indicator for a particular software application may be a name of the particular software application, for example. The name of the particular software application may be included in a user interface for the particular software application upon successfully loading or running the particular software application. For example, a software application may provide a webpage upon loading or running of the software application and that webpage may include a name of the software application. If loading of the software application is not successful then an error may be presented instead (e.g., as a popup window or as a message in the user interface). In the case of an error, the name of the application may not be included in the user interface or the user interface may not be provided or generated by the application at all.

The test management information may be stored as a table in the database 116. An example of such a table follows:

| Success Indicator | Access Information | Login Information | Test Status | Failure Reason |
|---|---|---|---|---|
| Timesheet | https://h7.corp/ui#TimeEntry | Username: Proj_Manage_comm Passord: Prog123 | | |

| Success Indicator | Access Information | Login Information | Test Status | Failure Reason |
|---|---|---|---|---|
| Scheduling Agreements | https://h7.corp/ui#Scheduling | Username: Internal_rep Password: Internal123 | | |
| Incoming Orders | https://h7.corp/ui#Incoming | Username: Internal_rep Password: Internal123 | | |

As shown in this example, multiple applications may be accessible using the same login information. However, each application may have their own different access information. The success indicators, access information, and login information may be prepopulated in the table and used in the testing of the software applications. The table may be updated with the test status (e.g., pass or fail) and the failure reasons during the execution of the test. The failure reason may be left empty or blank if an application passed the test. If the application failed, then the failure reason may state the reason that the test failed. For example, the failure reason may "Error Popup is displayed," "Application Header Title is missing" or "Application user interface does not include the success indicator," for example. In some embodiments, the failure reason may include an indication of what information was found that did not match the success indicator. For example, if the success indicator is a title found in a header of the application, and the title is written in a different way, then the failure reason may include the title as it was given by the application so that a user reviewing the logs may be able to identify whether the failure was a false positive or not. For instance, if the success indicator is "Application Title 1" for an application but the information found during validation of that application is "1$^{st}$ Applicant Title" then this may indicate that the application is loading correctly but it is the success indicator information that is incorrect. Accordingly, it is advantageous for the failure reason to include the set of information being compared and validated such that it may easily be reviewed from the logs to identify false positives.

The test execution functionality 113 of the test application 111 may be used to execute the test packages on the parallel execution system 120. Execution of the test packages may include authenticating with the applications using the login information. In some cases, the same username and password may be used for multiple applications in a test package and the authentication may only need to be performed once using that username and password. The test execution may also include loading the applications in the test package using the access information. For example, this may include accessing a URL for the application. The test execution may then validate whether the success indicator is included in an application interface that may be provided by the application in response to a login request. In some cases the application loads properly and the success indicator is provided in an application interface (e.g., web page) provided by the application. In other cases the application fails and an error (e.g., a popup window) is presented or the application's user interface fails to load.

The results of the validation and testing may be logged by logging functionality 114. The logging functionality may store the test status (e.g., passed or failed) and the failure reason for failed tests in database 116 (e.g., in a table as shown in the example above).

The test application 111 may also provide log review functionality 115 that provides an test review interface for reviewing the test status and failure reasons for the test. The log review functionality 115 may provide the user interface as a web page.

The client system 150 may include a client application 151 that can access the test review interface provided by the log review functionality 115 of the test application 111. The client system 150 may be a computer such as a desktop or laptop or a mobile device, for example. The client application 151 may be a web browser or a dedicated software application, for example. The client system 150 may include a display device for displaying elements a client user interface 152. The client user interface 152 may be a user interface of the client application 151. The client system 150 may communicate with the test management system 110 (e.g., over a local network or the Internet).

The testing performed by the test management system 110 may reduce the possibility of a defect in the applications. Furthermore, it may performed testing of multiple application within a time period that meets a predetermined time limit for emergency patch testing. For example, a test plan may perform a "smoke test" that loads two thousand cloud-based applications and that may be completed in than an hour with parallel execution on a parallel execution environment or platform. The loading of the application without further functional or regression testing may be performed in order to provide testing in a timely manner. The test configuration and execution are further described below.

Figure 2:
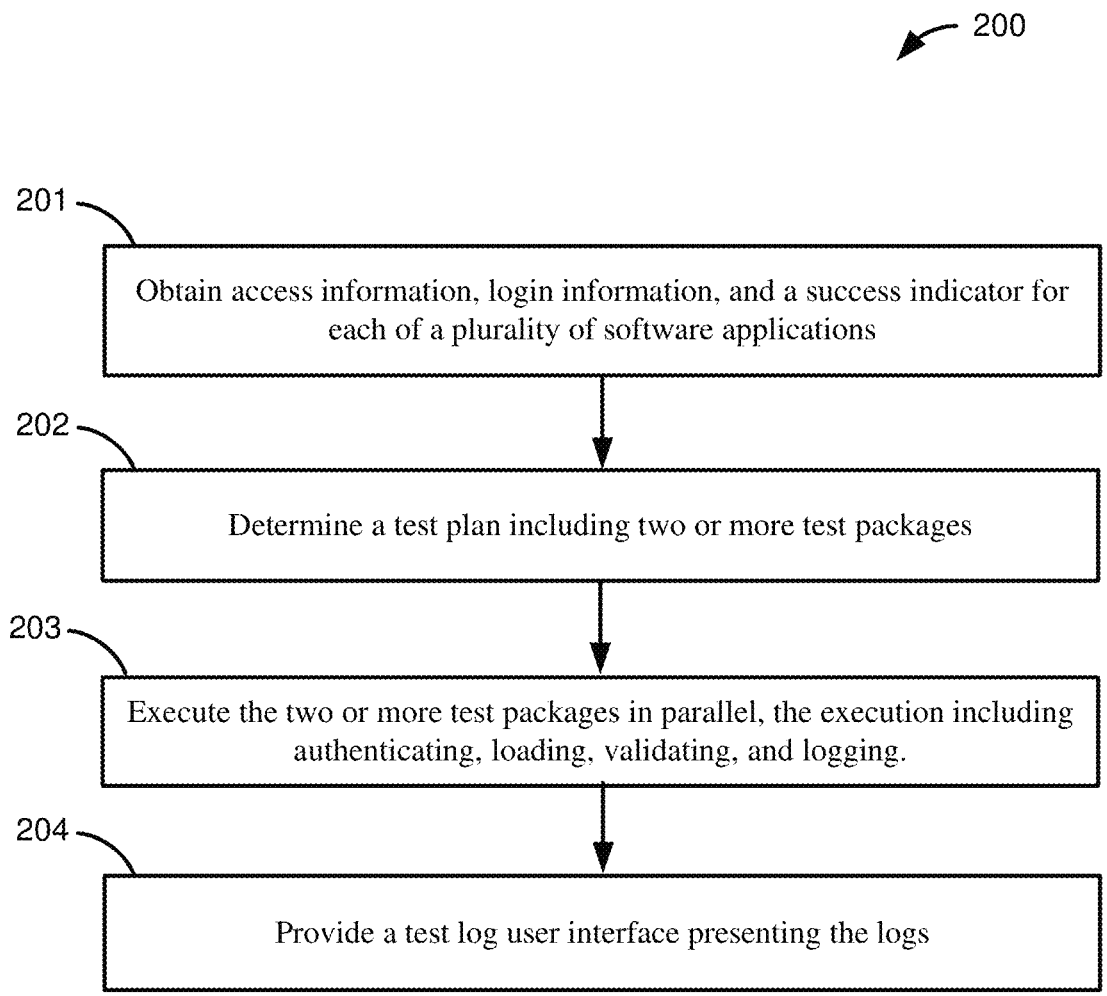
FIG. 2 shows a flowchart of a method for testing applications, according to an embodiment.

FIG. 2 shows a flowchart 200 of a method for testing applications, according to an embodiment. The method may be performed by a test management system as described herein.

At 201, the method obtain access information, login information, and a success indicator for each of a plurality of software applications. The access information for a particular software application may include a Uniform Resource Locator (URL) for a webpage providing access to the particular software application. Each application may have a corresponding URL used to access that application. For example, the applications may be provided by a cloud-based platform accessible using a web browser. The login information may include corresponding authentication credentials. The authentication credentials may be a username and a password, for example. The success indicator for a particular software application may be a name of the particular software application, for example. The name of the particular software application may be included in a user interface for the particular software application upon successfully loading or running the particular software application. For example, a software application may provide a webpage upon loading or running of the software application and that webpage may include a name of the software application. If loading of the software application is not successful then an error may be presented instead (e.g., as a popup window or as a message in the user interface). In the case of an error, the name of the application may not be included in the user interface or the user interface may not be provided or generated by the application at all.

At 202, the method determines a test plan including two or more test packages. Each test package of the two of more test packages indicating a subset of applications of the plurality of software applications and including access information corresponding to the subset of applications, login information corresponding to the subset of applications, and success indicators corresponding to the subset of applications. The applications included in a test package may be based on a role of the user having access to that application. For example, particular login information may be used to access multiple different applications and each of these applications may be included in the same test package. The test package may also include applications accessible using other login information. However, other test packages may not include the same login information included in this test package because authenticating with an application using login information may consume computing and network resources and the test execution time may be reduced by reducing the number of times that authentication is performed. For example, particular login information included in a particular test package of the two or more test packages may not included in any other test package of the two or more test packages, where two or more applications in the particular test package use the particular login information and the particular login information is used for authentication once during execution of the particular test package.

At 203, the method executes the two or more test packages in parallel. The execution of each test package of the two or more test packages including authenticating with the subset of applications using the corresponding login information, loading each of the subset of applications using the corresponding access information to obtain application interfaces, validating whether the application interfaces include the corresponding success indicator, and generating logs indicating whether the validation of the application interfaces passed or failed based on inclusion of the corresponding success indicator. The parallel execution of the test packages reduces the amount of time it takes to test each of the plurality of software applications. In some embodiments, the only input provided to each of the plurality of software applications during the execution of the two or more test packages is the corresponding login information and the corresponding access information. For example, the execution of the test does not include any functional testing or regression testing of the application beyond an attempt to load an initial user interface (e.g., web page) of the application (e.g., accessing the main page, the home screen, the landing page, or the initial loading page of the application). The scope of the testing may be reduced such that each of the plurality of applications may be tested within a predetermined time-limit threshold set for emergency software patches.

At 203, the method provides a test log user interface presenting a portion of the logs indicating whether the validation of the application interfaces passed or failed, wherein logs for failed validations include a failure reason.

In some embodiments, the method may further receive an input to the test log user interface to modify a particular log indicating whether a validation of a particular application interface passed or failed and modify the particular log to reflect the user input.

In some embodiments, the method may re-test application interfaces that failed to validate whether re-loaded application interfaces include the corresponding success indicator. That is, application that did not pass testing (e.g., applications that did not provide an application interface including the corresponding success indicator) may be tested a second time. The retest may resolve an issue where the application failed to load due to network conditions or another transitory condition. In such embodiments the method may update corresponding logs based on the validation of the re-loaded application interfaces and logs for applications that passed the re-test include both a pass indicator and a corresponding failure reason. That is, the log for a particular application may include the failure reason logged during the initial failed test and a pass indicator (replacing an initial failed indicator) indicating that the re-test passed.

Figure 3:
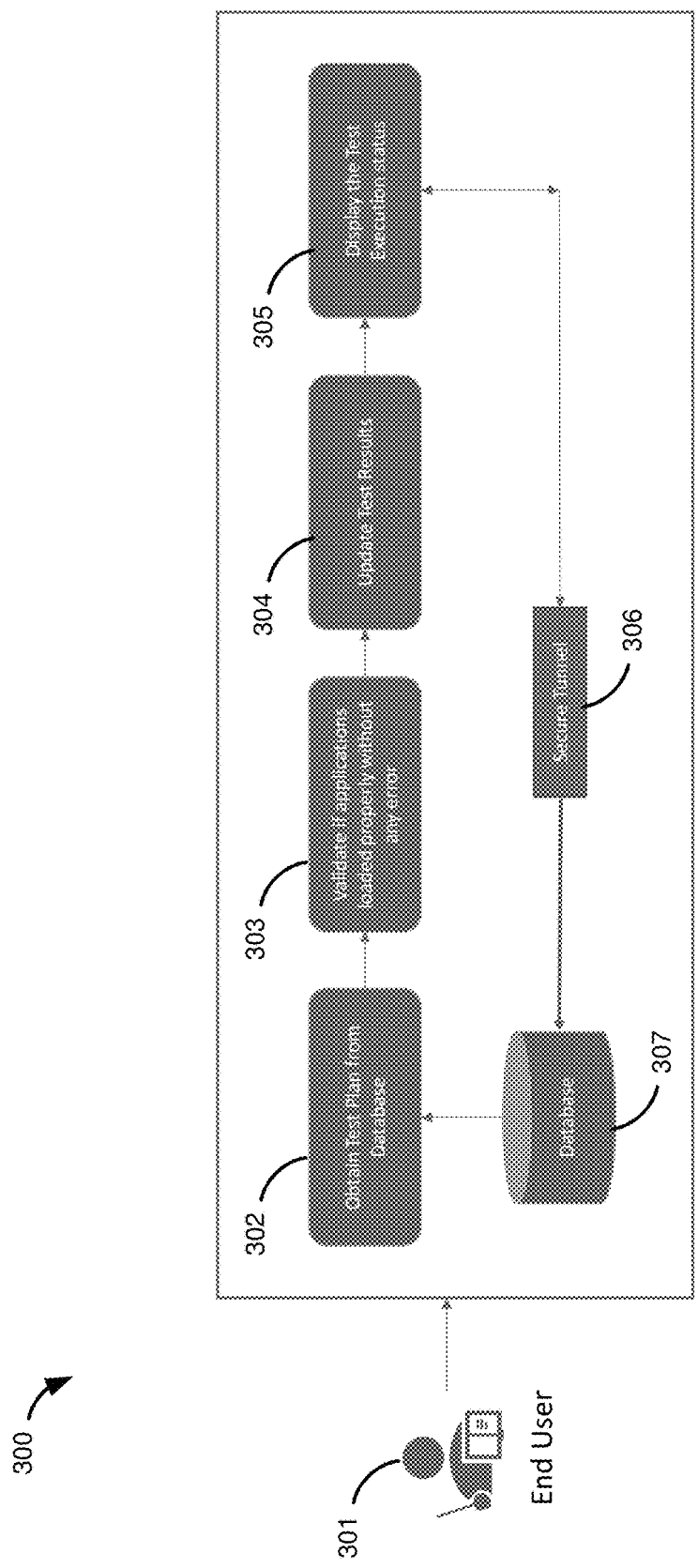
FIG. 3 shows a diagram of a testing process, according to an embodiment.

FIG. 3 shows a diagram 300 of a testing process, according to an embodiment. In this process, an end user 301 may access a test management system, which may be configured as described above. At 302, the test management system may read a list of apps for Smoke Test from Database (e.g., from a table as shown in the example above). At 302, logic for validating if the multiple applications are loaded properly without any error is executed. At 303, the smoke Test Results are updated in both the test management application and in the database. At 304, a test log review application may present or display the smoke test execution status and any failure reason. The end user 301 is able to edit the failure status and the edited failure status may be written back to the database 307 using a secure tunnel 306.

Figure 4:
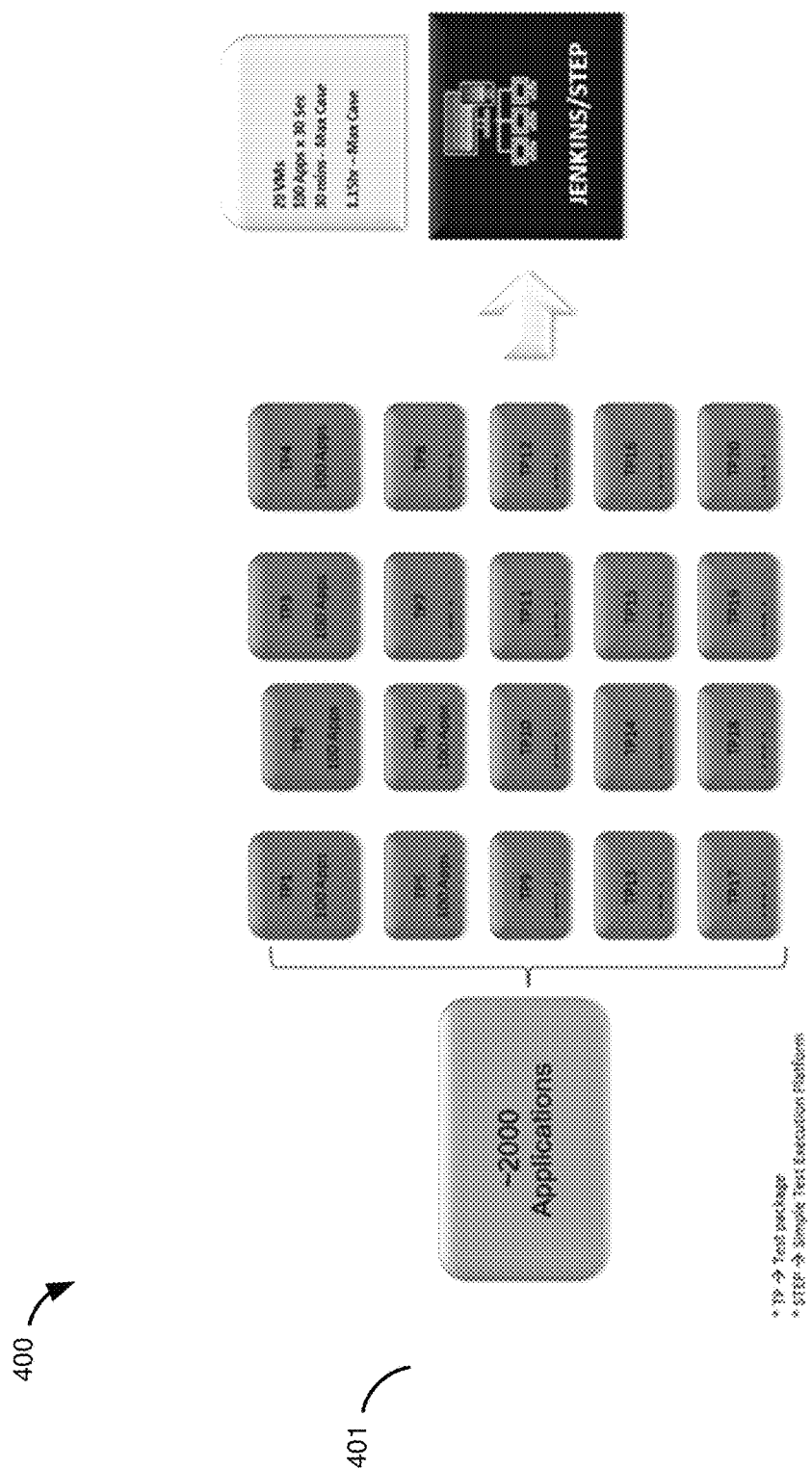
FIG. 4 shows a diagram of a test plan, according to an embodiment.

FIG. 4 shows a diagram 400 of a test plan, according to an embodiment. As shown in FIG. 4, the test plan may include 2,000 applications across 20 test packages where each test package includes 100 software applications to be tested. These test packages may be executed in parallel on a parallel execution platform such as JENKINS or STEP.

Figure 5:
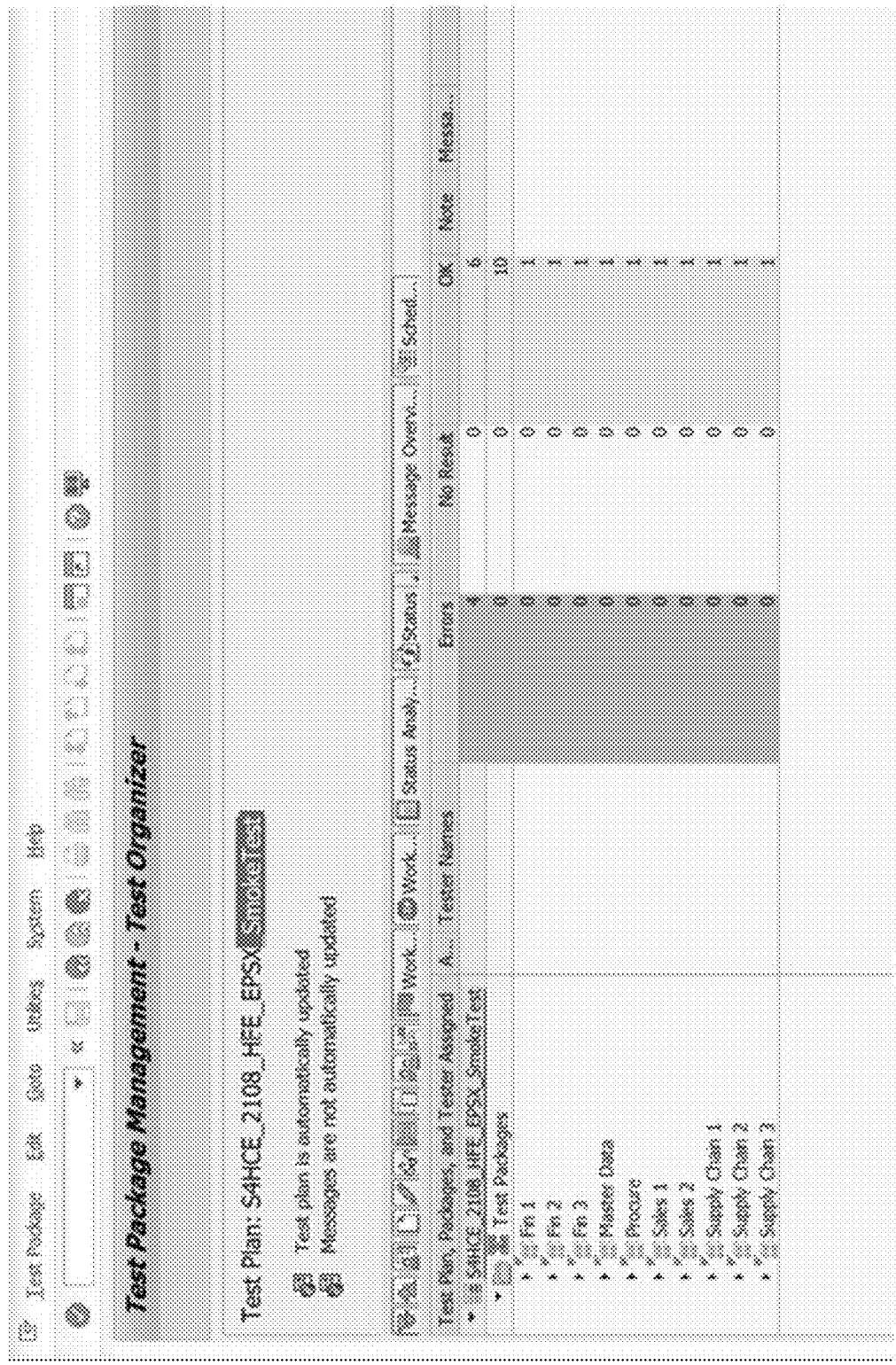
FIG. 5 shows an exemplary test management user interface, according to an embodiment.

FIG. 5 shows an exemplary test management user interface, according to an embodiment. This user interface shows 10 exemplary test packages.

Figure 6:
FIG. 6 shows an exemplary user interface for presenting test results, according to an embodiment.

FIG. 6 shows an exemplary user interface 600 for presenting test results, according to an embodiment. This user interface shows the status and reliability for each of the 10 exemplary test packages shown in FIG. 5.

Figure 7:
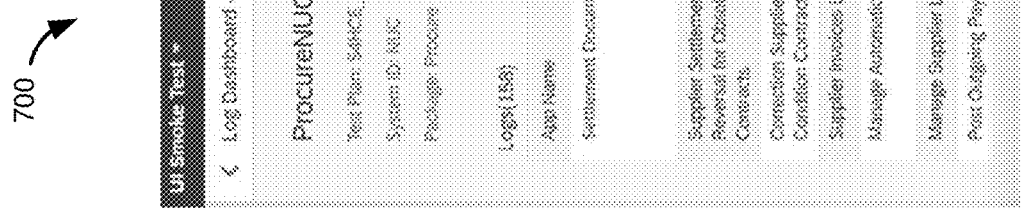
FIG. 7 shows an exemplary user interface for presenting test package logs, according to an embodiment.

FIG. 7 shows an exemplary user interface 700 for presenting test package logs, according to an embodiment. This user interface shows the results of the test of the applications in one of the test packages shown above in FIG. 6. The user interface includes the test status and the failure reason as discussed above.

Figure 8:
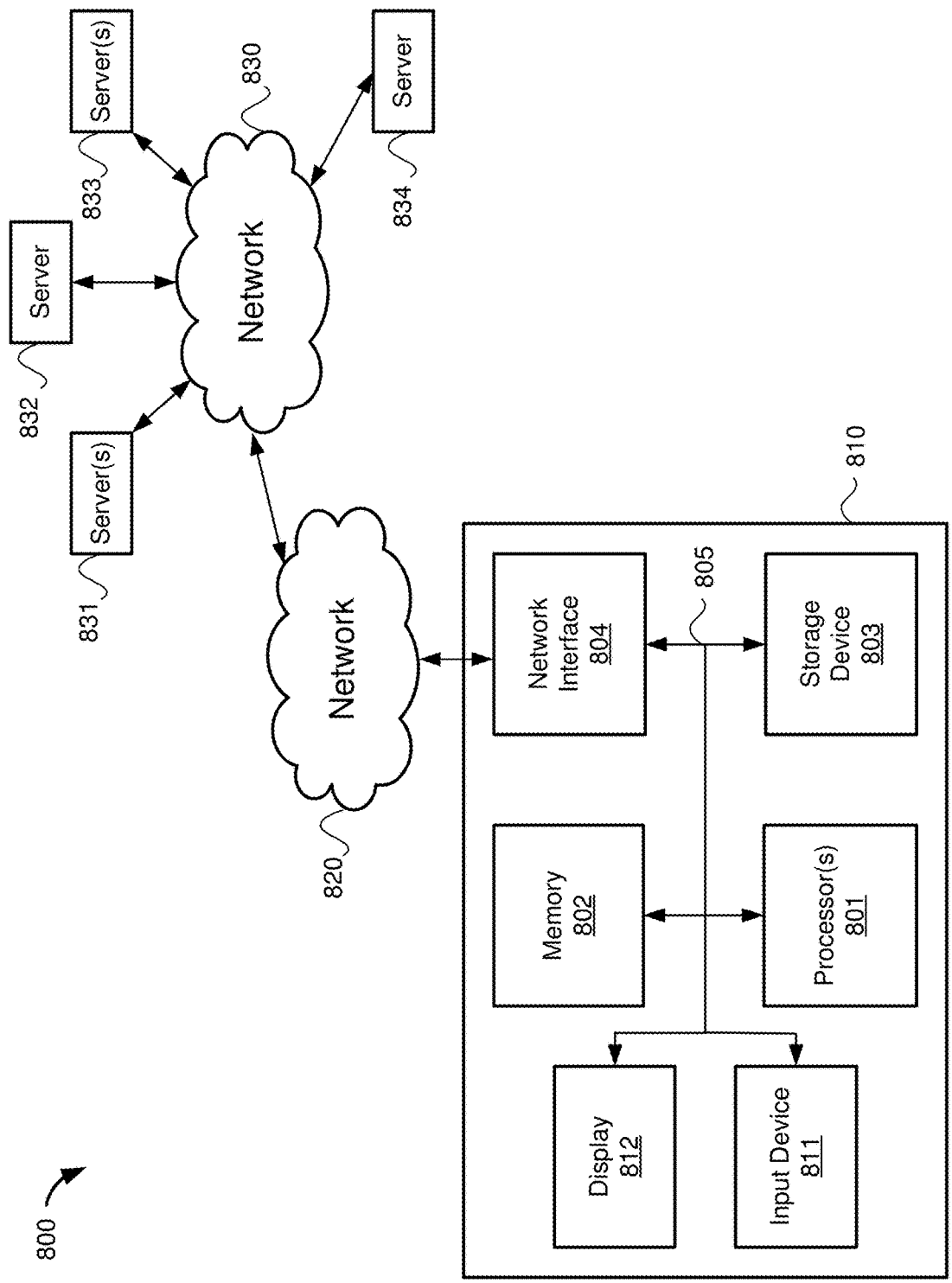
FIG. 8 shows a diagram of hardware of a special purpose computing system for implementing systems and methods described herein.

FIG. 8 shows a diagram 800 of hardware of a special purpose computing system 810 for implementing systems and methods described herein. The computer system 810 includes a bus 805 or other communication mechanism for communicating information, and one or more processors 801 coupled with bus 805 for processing information. The computer system 810 also includes a memory 802 coupled to bus 805 for storing information and instructions to be executed by processor 801, including information and instructions for performing some of the techniques described above, for example. This memory may also be used for storing programs executed by processor(s) 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 803 may include source code, binary code, or software files for performing the techniques above, such as the processes described above, for example. Storage device and memory are both examples of non-transitory computer readable storage mediums.

The computer system 810 may be coupled via bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized buses, for example.

The computer system also includes a network interface 804 coupled with bus 805. The network interface 804 may provide two-way data communication between computer system 810 and a network 820. The network interface 804 may be a wireless or wired connection, for example. The computer system 810 can send and receive information through the network interface 804 across a local area network, an Intranet, a cellular network, or the Internet, for example. In the Internet example, a browser, for example, may access data and features on backend systems that may reside on multiple different hardware servers 831-834 across the network. The servers 831-834 may be part of a cloud computing environment, for example.

ADDITIONAL EMBODIMENTS

Additional embodiments of the present disclosure are further described below.

Some embodiments provide a computer system comprising one or more processors and one or more machine-readable medium coupled to the one or more processors. The one or more machine-readable medium storing computer program code comprising sets of instructions executable by the one or more processors. The sets of instructions being executable to obtain access information, login information, and a success indicator for each of a plurality of software applications. The sets of instructions being further executable to determine a test plan including two or more test packages. Each test package of the two of more test packages indicates a subset of applications of the plurality of software applications and includes access information corresponding to the subset of applications, login information corresponding to the subset of applications, and success indicators corresponding to the subset of applications. The sets of instructions being further executable to execute the two or more test packages in parallel. The execution of each test package of the two or more test packages including authenticating with the subset of applications using the corresponding login information, loading each of the subset of applications using the corresponding access information to obtain application interfaces, validating whether the application interfaces include the corresponding success indicator, and generating logs indicating whether the validation of the application interfaces passed or failed based on inclusion of the corresponding success indicator. The sets of instructions being further executable to provide a test log user interface presenting a portion of the logs indicating whether the validation of the application interfaces passed or failed, where logs for failed validations include a failure reason.

In some embodiments of the computer system, the success indicator for a particular software application is a name of the particular software application, where the name of the particular software application is included in a user interface for the particular software application upon successfully loading or running the particular software application.

In some embodiments of the computer system, access information for a particular software application includes a Uniform Resource Locator for a webpage providing access to the particular software application.

In some embodiments of the computer system, the only input provided to each of the plurality of software applications during the execution of the two or more test packages is the corresponding login information and the corresponding access information.

In some embodiments of the computer system, particular login information included in a particular test package of the two or more test packages is not included in any other test package of the two or more test packages. In this embodiment, two or more applications in the particular test package use the particular login information and the particular login information is used for authentication once during execution of the particular test package.

In some embodiments of the computer system, the computer program code further comprises sets of instructions executable by the one or more processors to receive an input to the test log user interface to modify a particular log indicating whether a validation of a particular application interface passed or failed and modify the particular log to reflect the user input.

In some embodiments of the computer system, the computer program code further comprises sets of instructions executable by the one or more processors to re-test application interfaces that failed to validate whether re-loaded application interfaces include the corresponding success indicator and update corresponding logs based on the validation of the re-loaded application interfaces. In such embodiments, logs for applications that passed the re-test include both a pass indicator and a corresponding failure reason.

Some embodiments provide one or more non-transitory computer-readable medium storing computer program code. The computer program code comprises sets of instructions to obtain access information, login information, and a success indicator for each of a plurality of software applications. The computer program code further comprising sets of instructions to determine a test plan including two or more test packages. Each test package of the two of more test packages indicating a subset of applications of the plurality of software applications and including access information corresponding to the subset of applications, login information corresponding to the subset of applications, and success indicators corresponding to the subset of applications. The computer program code further comprising sets of instructions to execute the two or more test packages in parallel. The execution of each test package of the two or more test packages including authenticating with the subset of applications using the corresponding login information, loading each of the subset of applications using the corresponding access information to obtain application interfaces, validating whether the application interfaces include the corresponding success indicator, and generating logs indicating whether the validation of the application interfaces passed or failed based on inclusion of the corresponding success indicator. The computer program code further comprising sets of instructions to provide a test log user interface presenting a portion of the logs indicating whether the validation of the application interfaces passed or failed, where logs for failed validations include a failure reason.

In some embodiments of the non-transitory computer-readable medium, the success indicator for a particular software application is a name of the particular software application, wherein the name of the particular software application is included in a user interface for the particular software application upon successfully loading or running the particular software application.

In some embodiments of the non-transitory computer-readable medium, access information for a particular software application includes a Uniform Resource Locator for a webpage providing access to the particular software application.

In some embodiments of the non-transitory computer-readable medium, the only input provided to each of the plurality of software applications during the execution of the two or more test packages is the corresponding login information and the corresponding access information.

In some embodiments of the non-transitory computer-readable medium, particular login information included in a particular test package of the two or more test packages is not included in any other test package of the two or more test packages. In such embodiments, two or more applications in the particular test package use the particular login information and the particular login information is used for authentication once during execution of the particular test package.

In some embodiments of the non-transitory computer-readable medium, the computer program code further comprises sets of instructions to receive an input to the test log user interface to modify a particular log indicating whether a validation of a particular application interface passed or failed and modify the particular log to reflect the user input.

In some embodiments of the non-transitory computer-readable medium, the computer program code further comprises sets of instructions to re-test application interfaces that failed to validate whether re-loaded application interfaces include the corresponding success indicator and update corresponding logs based on the validation of the re-loaded application interfaces. In such embodiments, logs for applications that passed the re-test include both a pass indicator and a corresponding failure reason.

Some embodiments provide a computer-implemented method. The method comprises obtaining access information, login information, and a success indicator for each of a plurality of software applications. The method further comprises determining a test plan including two or more test packages. Each test package of the two of more test packages indicating a subset of applications of the plurality of software applications and including access information corresponding to the subset of applications, login information corresponding to the subset of applications, and success indicators corresponding to the subset of applications. The method further comprises executing the two or more test packages in parallel. The execution of each test package of the two or more test packages including authenticating with the subset of applications using the corresponding login information, loading each of the subset of applications using the corresponding access information to obtain application interfaces, validating whether the application interfaces include the corresponding success indicator, and generating logs indicating whether the validation of the application interfaces passed or failed based on inclusion of the corresponding success indicator. The method further comprises providing a test log user interface presenting a portion of the logs indicating whether the validation of the application interfaces passed or failed, where logs for failed validations include a failure reason.

In some embodiments of the computer-implemented method, the success indicator for a particular software application is a name of the particular software application, wherein the name of the particular software application is included in a user interface for the particular software application upon successfully loading or running the particular software application.

In some embodiments of the computer-implemented method, access information for a particular software application includes a Uniform Resource Locator for a webpage providing access to the particular software application.

In some embodiments of the computer-implemented method, the only input provided to each of the plurality of software applications during the execution of the two or more test packages is the corresponding login information and the corresponding access information.

In some embodiments of the computer-implemented method, particular login information included in a particular test package of the two or more test packages is not included in any other test package of the two or more test packages. In such embodiments, two or more applications in the particular test package use the particular login information, wherein the particular login information is used for authentication once during execution of the particular test package.

In some embodiments of the computer-implemented method, the method further comprises receiving an input to the test log user interface to modify a particular log indicating whether a validation of a particular application interface passed or failed and modifying the particular log to reflect the user input.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer system, comprising:
   one or more processors; and
   one or more machine-readable medium coupled to the one or more processors and storing computer program code comprising sets of instructions executable by the one or more processors to:
   obtain access information, login information, and a success indicator for each of a plurality of software applications;
   determine a test plan including two or more test packages, each test package of the two of more test packages indicating a subset of applications of the plurality of software applications and including access information corresponding to the subset of applications, login information corresponding to the subset of applications, and success indicators corresponding to the subset of applications;
   execute the two or more test packages in parallel, the execution of each test package of the two or more test packages including authenticating with the subset of applications using the corresponding login information, loading each of the subset of applications using the corresponding access information to obtain application interfaces, validating whether the application interfaces include the corresponding success indicator, and generating logs indicating whether the validation of the application interfaces passed or failed based on inclusion of the corresponding success indicator; and provide a test log user interface presenting a portion of the logs indicating whether the validation of the application interfaces passed or failed, wherein logs for failed validations include a failure reason.

2. The computer system of claim 1, wherein the success indicator for a particular software application is a name of the particular software application, wherein the name of the particular software application is included in a user interface for the particular software application upon successfully loading or running the particular software application.

3. The computer system of claim 1, wherein access information for a particular software application includes a Uniform Resource Locator for a webpage providing access to the particular software application.

4. The computer system of claim 1, wherein the only input provided to each of the plurality of software applications during the execution of the two or more test packages is the corresponding login information and the corresponding access information.

5. The computer system of claim 1, wherein particular login information included in a particular test package of the two or more test packages is not included in any other test package of the two or more test packages, wherein two or more applications in the particular test package use the particular login information, wherein the particular login information is used for authentication once during execution of the particular test package.

6. The computer system of claim 1, wherein the computer program code further comprises sets of instructions executable by the one or more processors to:

receive an input to the test log user interface to modify a particular log indicating whether a validation of a particular application interface passed or failed; and modify the particular log to reflect the user input.

7. The computer system of claim 1, wherein the computer program code further comprises sets of instructions executable by the one or more processors to:

re-test application interfaces that failed to validate whether re-loaded application interfaces include the corresponding success indicator; and update corresponding logs based on the validation of the re-loaded application interfaces, wherein logs for applications that passed the re-test include both a pass indicator and a corresponding failure reason.

8. One or more non-transitory computer-readable medium storing computer program code comprising sets of instructions to:

obtain access information, login information, and a success indicator for each of a plurality of software applications;

determine a test plan including two or more test packages, each test package of the two of more test packages indicating a subset of applications of the plurality of software applications and including access information corresponding to the subset of applications, login information corresponding to the subset of applications, and success indicators corresponding to the subset of applications;

execute the two or more test packages in parallel, the execution of each test package of the two or more test packages including authenticating with the subset of applications using the corresponding login information, loading each of the subset of applications using the corresponding access information to obtain application interfaces, validating whether the application interfaces include the corresponding success indicator, and generating logs indicating whether the validation of the application interfaces passed or failed based on inclusion of the corresponding success indicator; and provide a test log user interface presenting a portion of the logs indicating whether the validation of the application interfaces passed or failed, wherein logs for failed validations include a failure reason.

9. The non-transitory computer-readable medium of claim 8, wherein the success indicator for a particular software application is a name of the particular software application, wherein the name of the particular software application is included in a user interface for the particular software application upon successfully loading or running the particular software application.

10. The non-transitory computer-readable medium of claim 8, wherein access information for a particular software application includes a Uniform Resource Locator for a webpage providing access to the particular software application.

11. The non-transitory computer-readable medium of claim 8, wherein the only input provided to each of the plurality of software applications during the execution of the two or more test packages is the corresponding login information and the corresponding access information.

12. The non-transitory computer-readable medium of claim 8, wherein particular login information included in a particular test package of the two or more test packages is not included in any other test package of the two or more test packages, wherein two or more applications in the particular test package use the particular login information, wherein the particular login information is used for authentication once during execution of the particular test package.

13. The non-transitory computer-readable medium of claim 8, wherein the computer program code further comprises sets of instructions to:

receive an input to the test log user interface to modify a particular log indicating whether a validation of a particular application interface passed or failed; and modify the particular log to reflect the user input.

14. The non-transitory computer-readable medium of claim 8, wherein the computer program code further comprises sets of instructions to:

re-test application interfaces that failed to validate whether re-loaded application interfaces include the corresponding success indicator; and update corresponding logs based on the validation of the re-loaded application interfaces, wherein logs for applications that passed the re-test include both a pass indicator and a corresponding failure reason.

15. A computer-implemented method, comprising:

obtaining access information, login information, and a success indicator for each of a plurality of software applications;

determining a test plan including two or more test packages, each test package of the two of more test packages indicating a subset of applications of the plurality of software applications and including access information corresponding to the subset of applications, login information corresponding to the subset of applications, and success indicators corresponding to the subset of applications;

executing the two or more test packages in parallel, the execution of each test package of the two or more test packages including authenticating with the subset of applications using the corresponding login information, loading each of the subset of applications using the corresponding access information to obtain application interfaces, validating whether the application interfaces include the corresponding success indicator, and generating logs indicating whether the validation of the application interfaces passed or failed based on inclusion of the corresponding success indicator; and providing a test log user interface presenting a portion of the logs indicating whether the validation of the application interfaces passed or failed, wherein logs for failed validations include a failure reason.

16. The computer-implemented method of claim 15, wherein the success indicator for a particular software application is a name of the particular software application, wherein the name of the particular software application is included in a user interface for the particular software application upon successfully loading or running the particular software application.

17. The computer-implemented method of claim 15, wherein access information for a particular software application includes a Uniform Resource Locator for a webpage providing access to the particular software application.

18. The computer-implemented method of claim 15, wherein the only input provided to each of the plurality of software applications during the execution of the two or more test packages is the corresponding login information and the corresponding access information.

19. The computer-implemented method of claim 15, wherein particular login information included in a particular test package of the two or more test packages is not included in any other test package of the two or more test packages, wherein two or more applications in the particular test package use the particular login information, wherein the particular login information is used for authentication once during execution of the particular test package.

20. The computer-implemented method of claim 15, further comprising:

receiving an input to the test log user interface to modify a particular log indicating whether a validation of a particular application interface passed or failed; and modifying the particular log to reflect the user input.

* * * * *